US010533356B2

(12) United States Patent
Amante et al.

(10) Patent No.: US 10,533,356 B2
(45) Date of Patent: Jan. 14, 2020

(54) LATCH SYSTEM WITH POSITION HOLD

(71) Applicant: Bell Helicopter Textron Inc., Fort Worth, TX (US)

(72) Inventors: William A. Amante, Grapevine, TX (US); Arunkumar Koppa Siddalingappa, Tumkur (IN)

(73) Assignee: Textron Innovations Inc., Providence, RI (US)

( * ) Notice: Subject to any disclaimer, the term of this patent is extended or adjusted under 35 U.S.C. 154(b) by 406 days.

(21) Appl. No.: 15/401,968

(22) Filed: Jan. 9, 2017

(65) Prior Publication Data

US 2018/0195325 A1 Jul. 12, 2018

(51) Int. Cl.
*B64C 1/14* (2006.01)
*E05C 9/18* (2006.01)
*E05B 17/20* (2006.01)
*E05C 1/04* (2006.01)
*E05C 7/04* (2006.01)
*B64C 27/04* (2006.01)
*E05B 77/16* (2014.01)
*E05B 83/38* (2014.01)
*E05C 9/04* (2006.01)

(52) U.S. Cl.
CPC .......... *E05C 9/1841* (2013.01); *B64C 1/1407* (2013.01); *B64C 1/1438* (2013.01); *B64C 27/04* (2013.01); *E05B 17/2007* (2013.01); *E05B 17/2057* (2013.01); *E05B 77/16* (2013.01); *E05B 83/38* (2013.01); *E05C 1/04* (2013.01); *E05C 7/045* (2013.01); *E05C 9/042* (2013.01)

(58) Field of Classification Search
CPC ....... E05C 9/1841; E05C 1/04; B64C 1/1407; B64C 1/1438; B64C 27/04; E05B 17/2007; E05B 17/2057; E05B 77/16; E05B 83/38
See application file for complete search history.

(56) References Cited

U.S. PATENT DOCUMENTS

| 1,508,029 | A | * | 9/1924 | Segal | ........................ E05C 1/04 |
| | | | | | 292/150 |
| 3,004,303 | A | * | 10/1961 | Wilmer | .................... B64C 1/143 |
| | | | | | 244/129.5 |
| 3,131,892 | A | * | 5/1964 | Salmun | ..................... B64C 1/14 |
| | | | | | 244/129.5 |

(Continued)

FOREIGN PATENT DOCUMENTS

| EP | 0428225 A1 | 5/1991 |
| FR | 1349341 A | 1/1964 |
| FR | 350285 A | 12/2005 |

(Continued)

OTHER PUBLICATIONS

Exam Report in related European Patent Application No. 17154653.4; dated Jun. 12, 2017; 5 pages.

(Continued)

*Primary Examiner* — Justin M Benedik
(74) *Attorney, Agent, or Firm* — Lightfoot & Alford PLLC

(57) ABSTRACT

A latch system has a pin movable along a pin axis, a control rod connected to the pin, a control wall comprising a control aperture comprising a lock hole joined to an unlock hole by a rod channel, and a control knob biased toward the pin, wherein the control knob comprises a lock tip sized to fit within each of the lock hole and the unlock hole.

20 Claims, 10 Drawing Sheets

(56) References Cited

U.S. PATENT DOCUMENTS

2005/0133667 A1* 6/2005 Pahl ..................... B64C 1/1407
                                                    244/129.5

FOREIGN PATENT DOCUMENTS

FR          3005981      * 11/2014
FR          3005981 A1    11/2014

OTHER PUBLICATIONS

European Search Report in related European Patent Application No. 17154653.4; dated May 22, 2017; 4 pages.
Intention to Grant in related European Patent Application No. 17154653.4 dated Sep. 12, 2018; 31 pages.

* cited by examiner

LATCH SYSTEM WITH POSITION HOLD

BACKGROUND

Vehicle door latch systems, such as, but not limited to, door latch systems for helicopters and other aircraft comprise features configured to positively hold a latch in either a locked position or an unlocked position. It can be particularly important that door latch systems used with helicopters and other aircraft do not accidentally become unlatched so that doors do not open during flight unless intended to be opened. Some doors remaining closed is a safety of flight issue which requires latches that are fail-safe from inadvertently opening in flight. While some door latch systems utilize an overcenter feature to maintain a door latch in an open position or a closed position, some overcenter features require utilization of complicated, expensive, and/or heavy components or can inadvertently unlatch.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
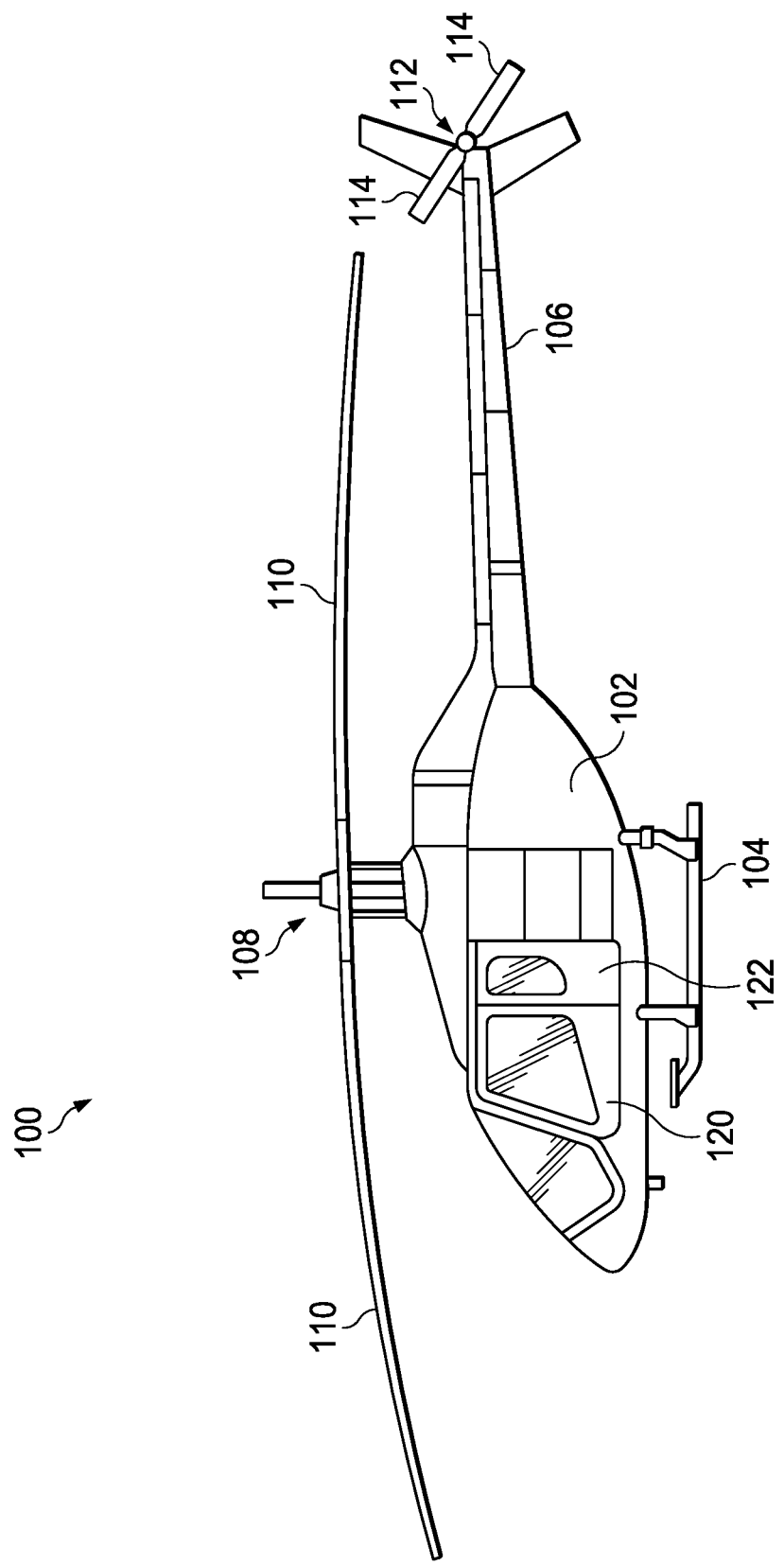
FIG. 1 is an orthogonal left side view of a helicopter according to an embodiment of this disclosure.
Figure 2:
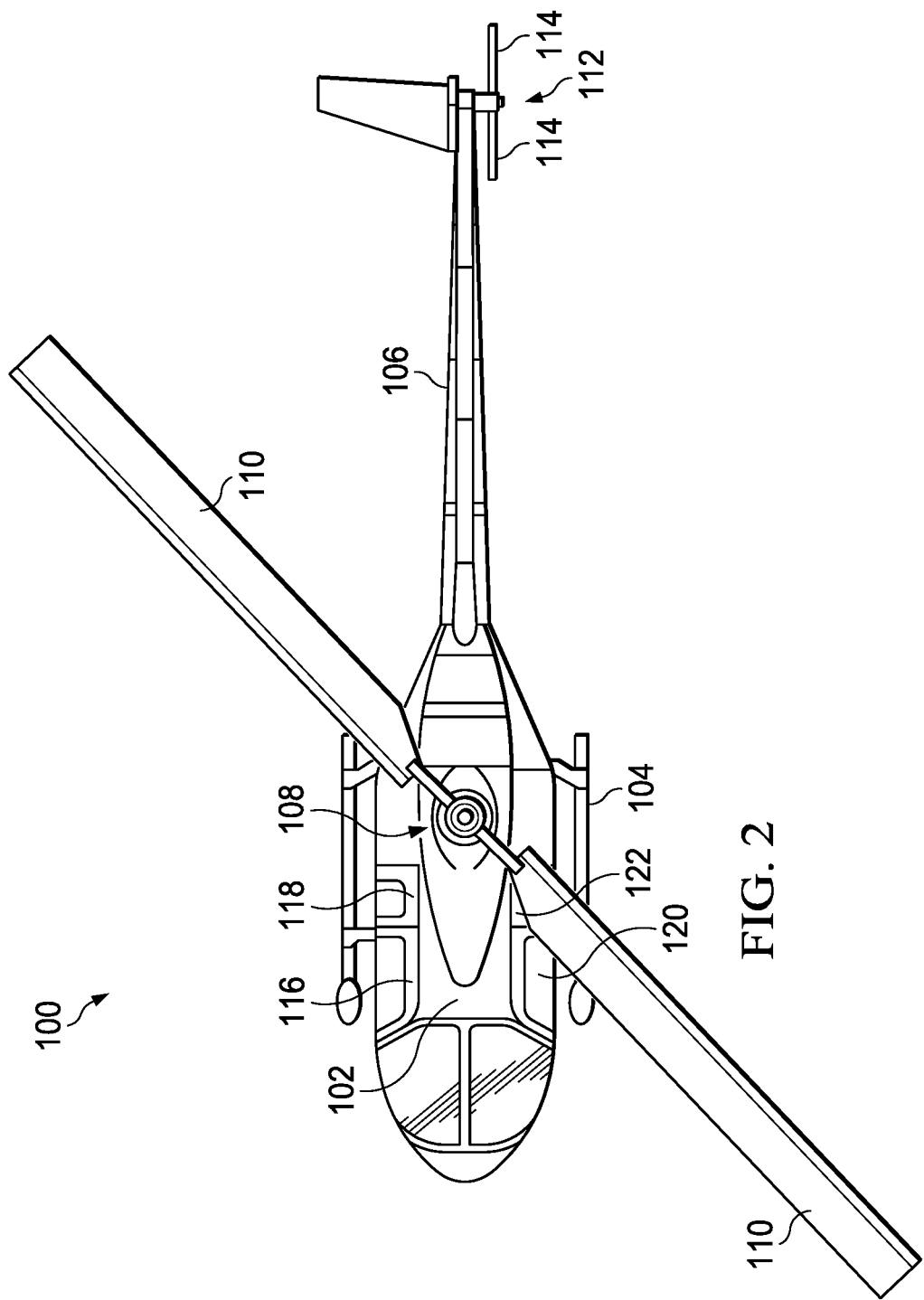
FIG. 2 is an orthogonal top view of the aircraft of FIG. 1.
Figure 3:
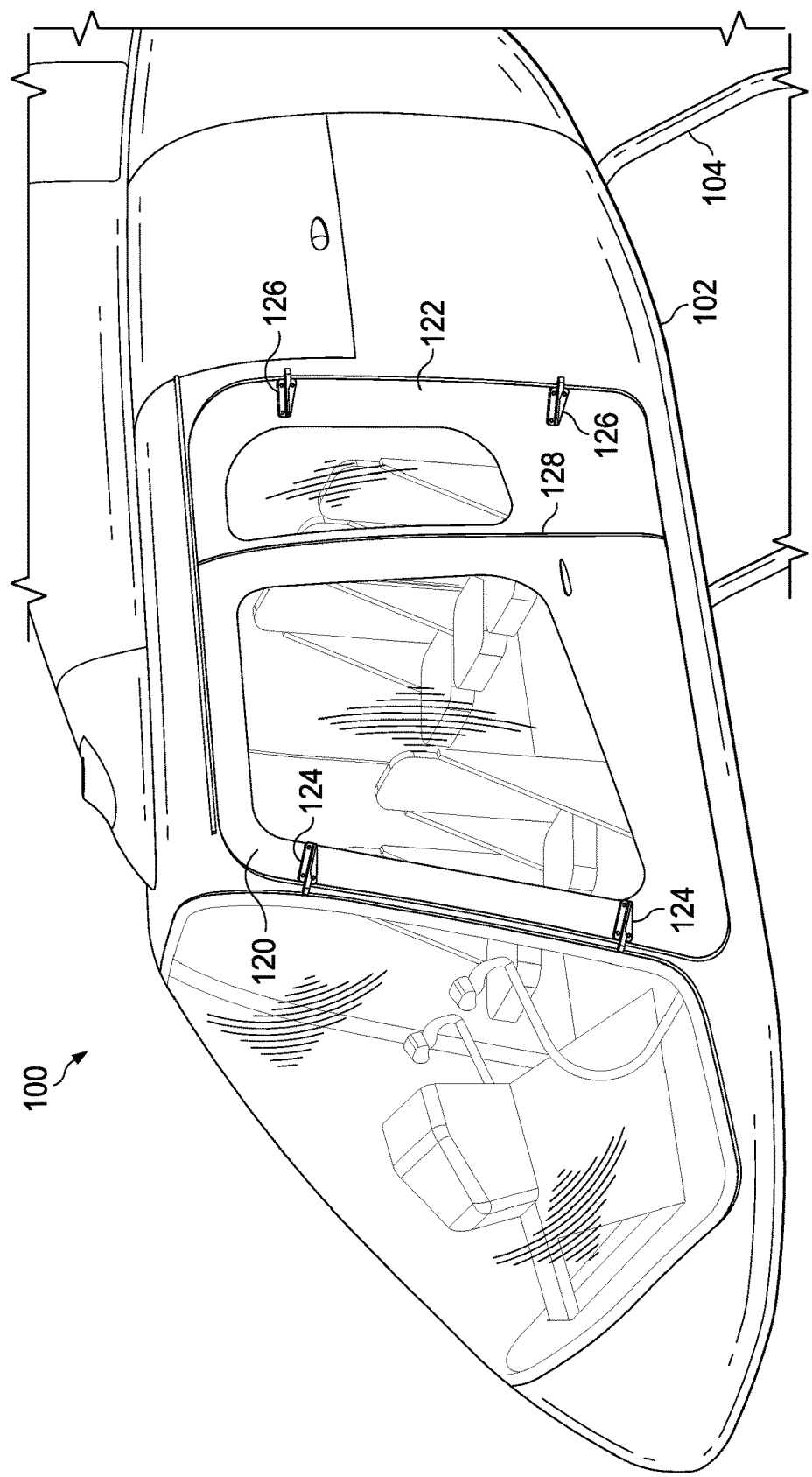
FIG. 3 is a partial oblique left side view of the aircraft of FIG. 1 showing doors of the aircraft of FIG. 1 in greater detail.
Figure 4:
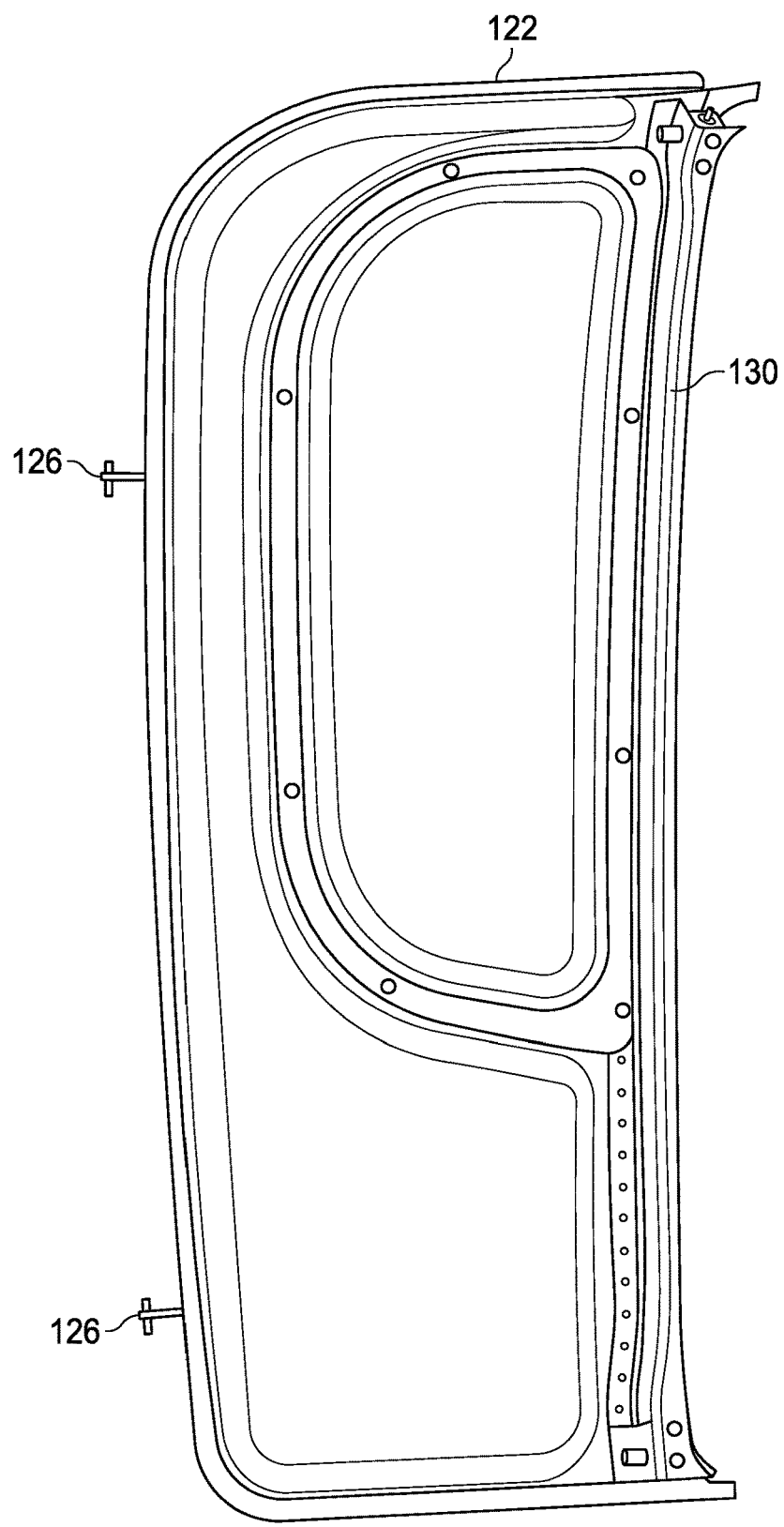
FIG. 4 is an orthogonal right side view of an aft left door of FIG. 3.
Figure 5:
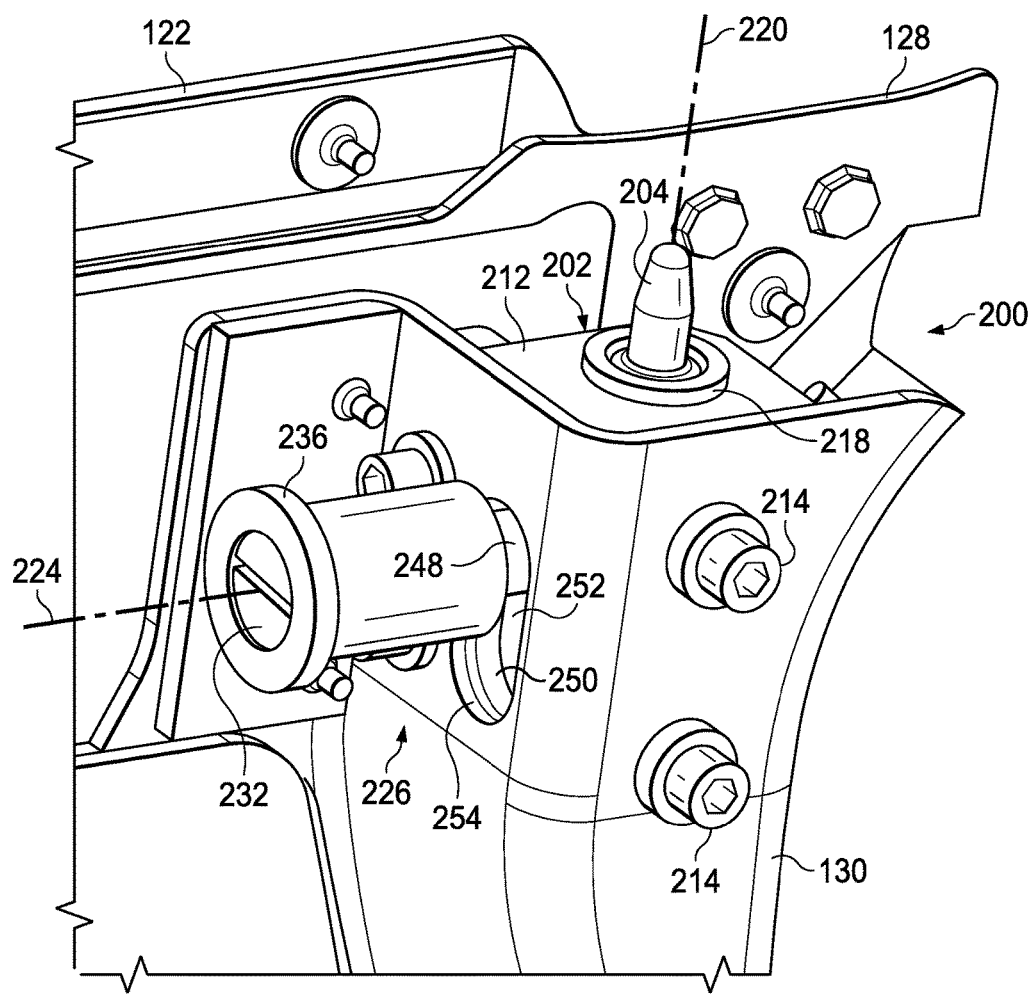
FIG. 5 is an oblique rear-right view of an upper located latch system of the aft left door of FIG. 3.
Figure 6:
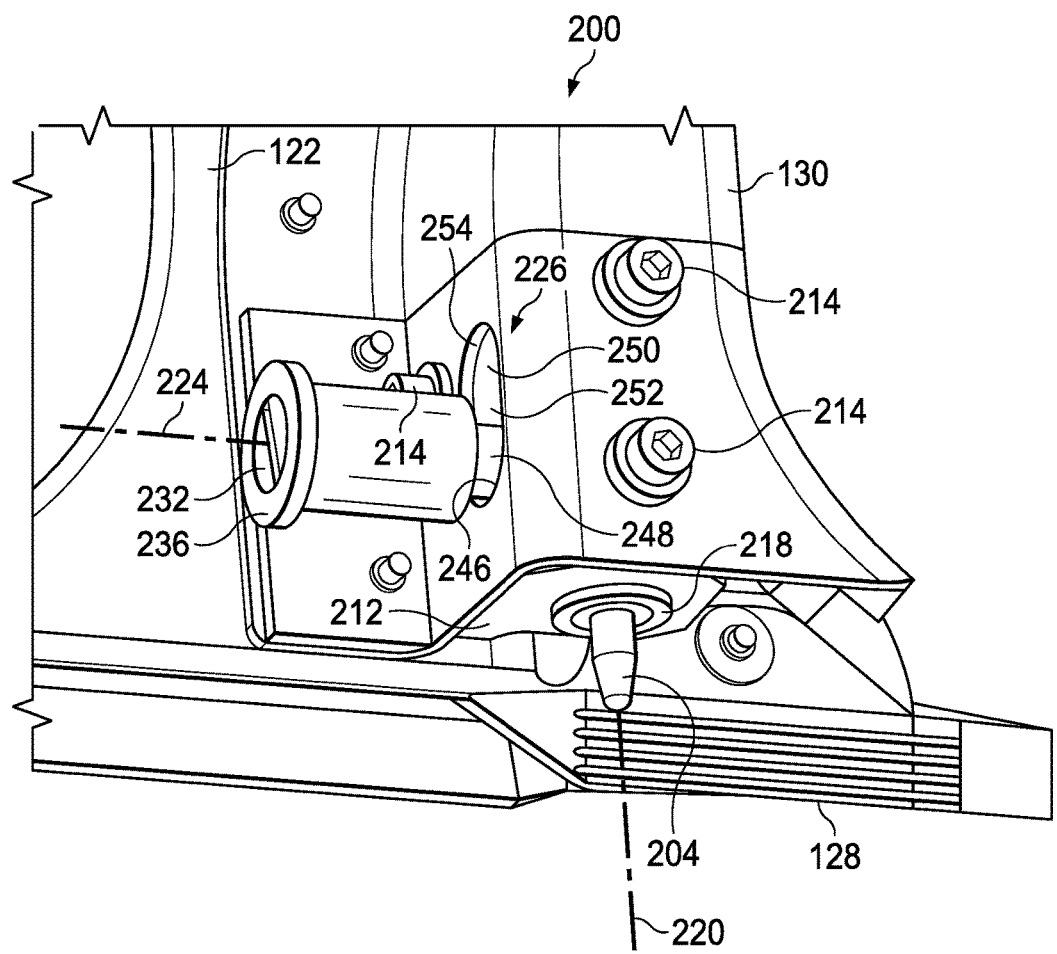
FIG. 6 is an oblique rear-right view of a lower located latch system of the aft left door of FIG. 3.
Figure 7:
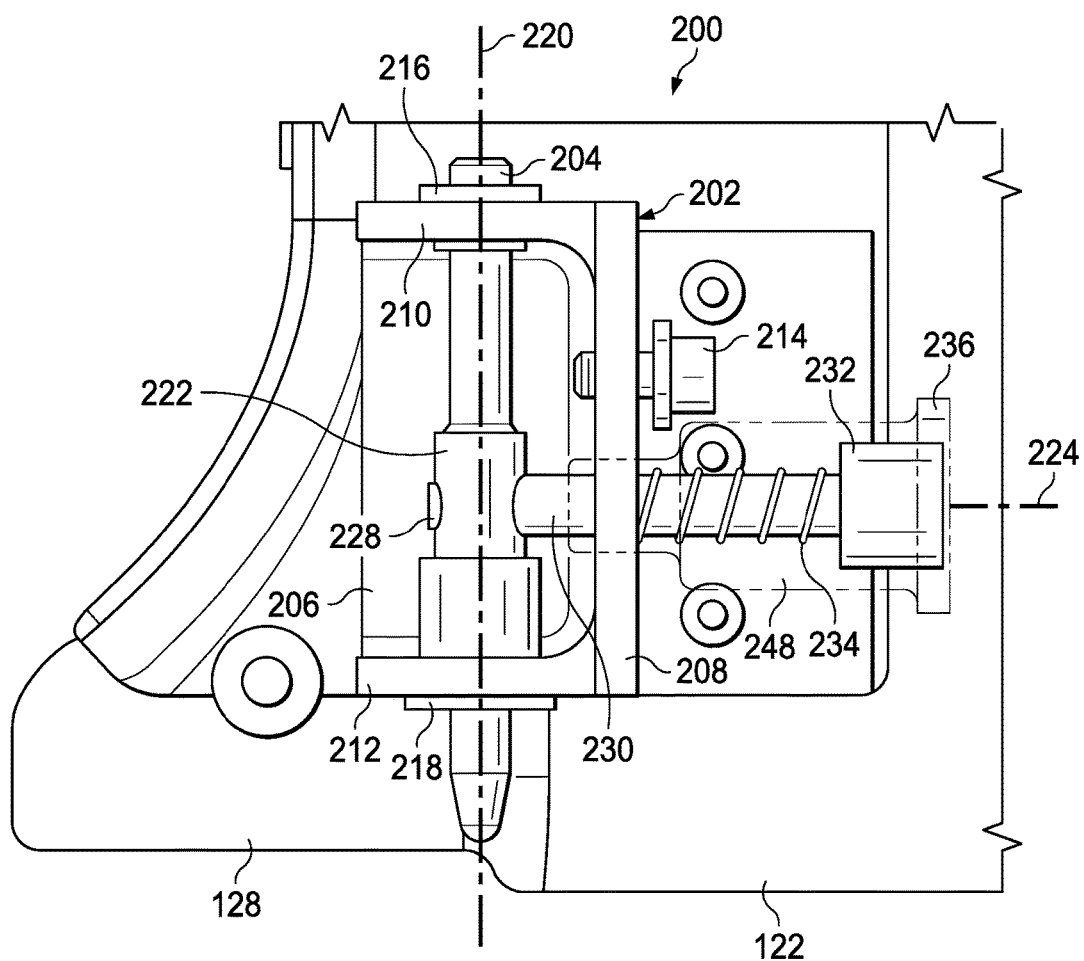
FIG. 7 is an orthogonal side view of the lower located latch system of FIG. 6.
Figure 8:
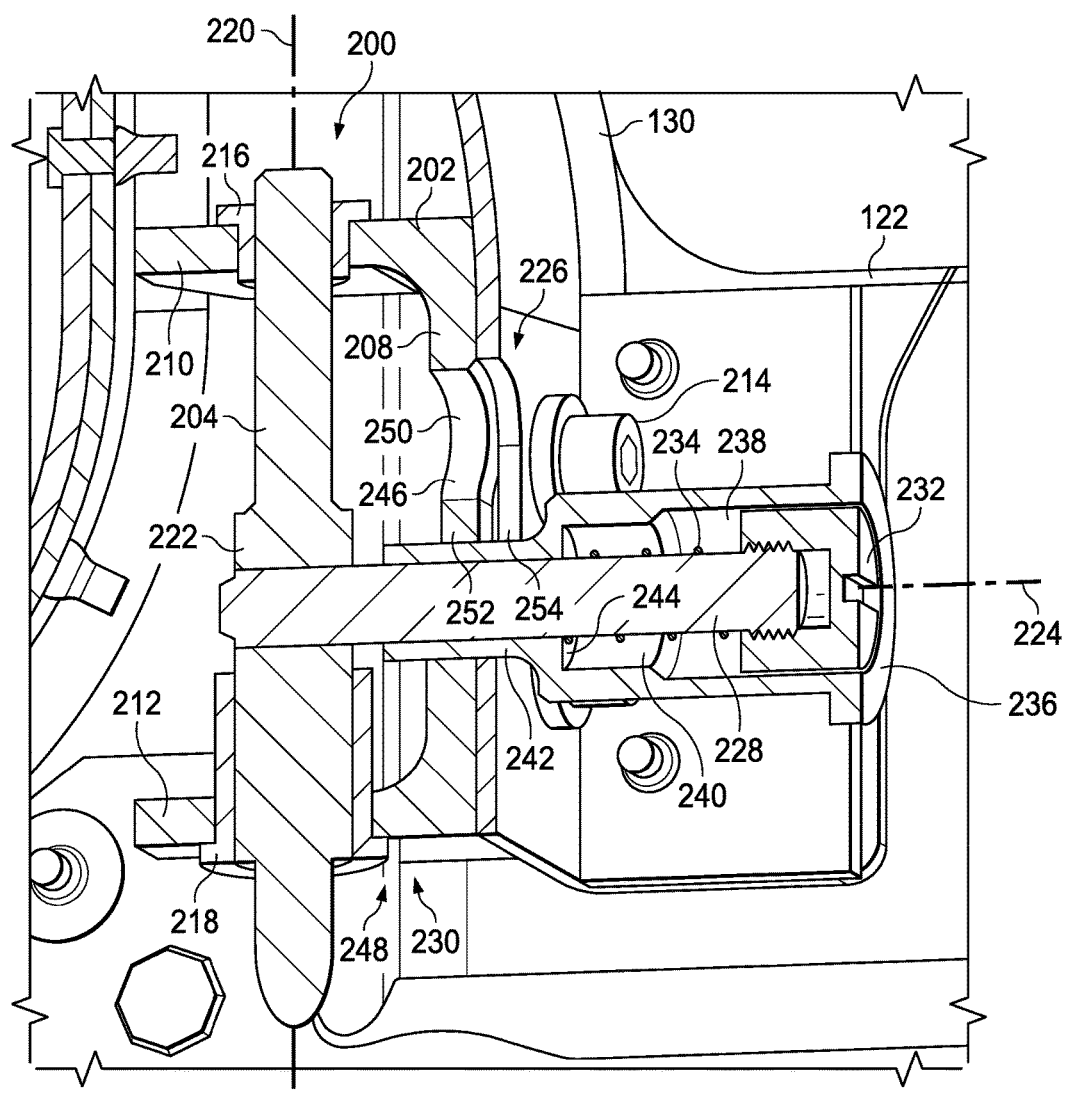
FIG. 8 is an oblique cutaway view of the lower located latch system of FIG. 6.
Figure 9:
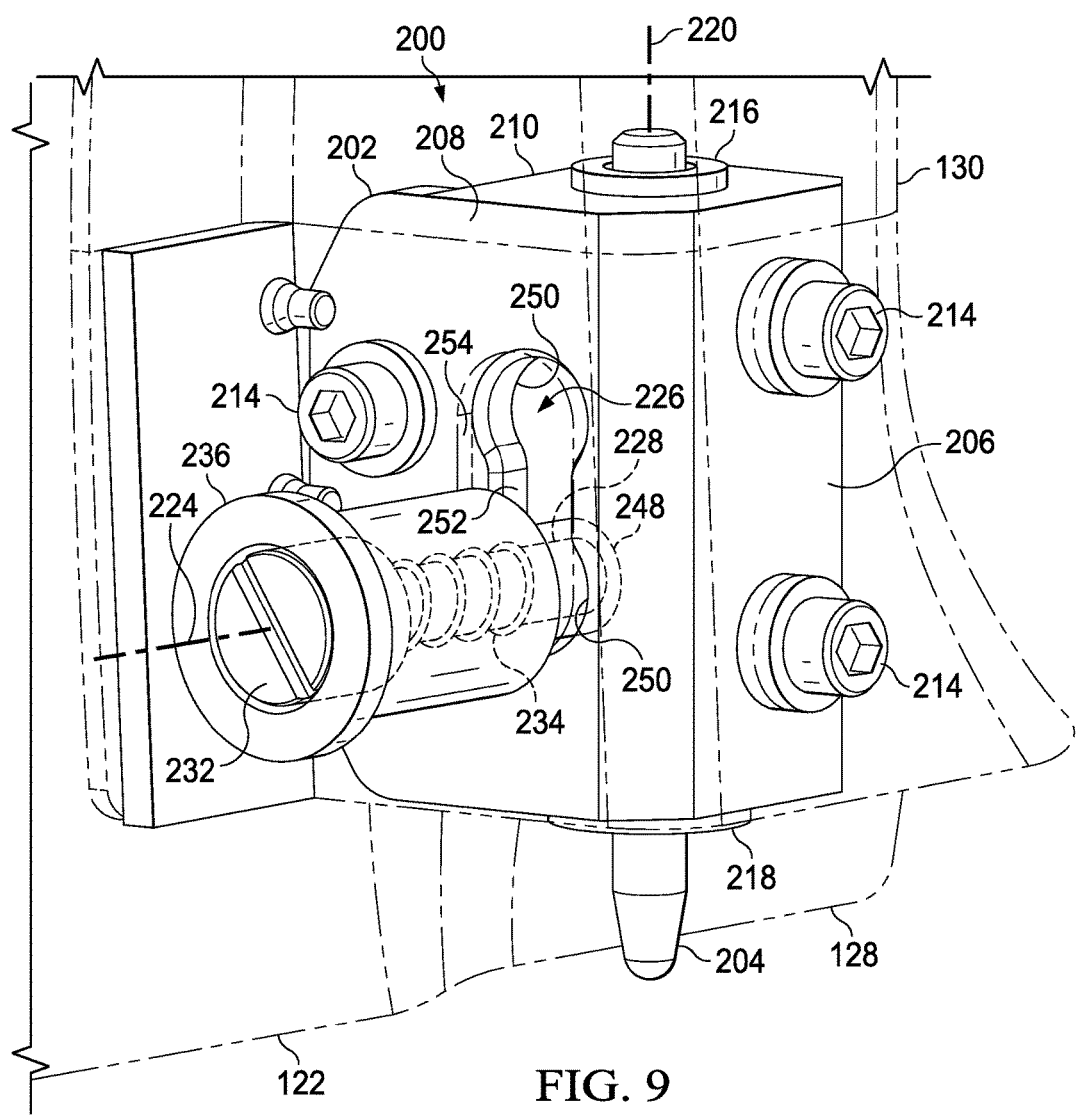
FIG. 9 is a rear-right oblique view of the lower located latch system of FIG. 6.
Figure 10:
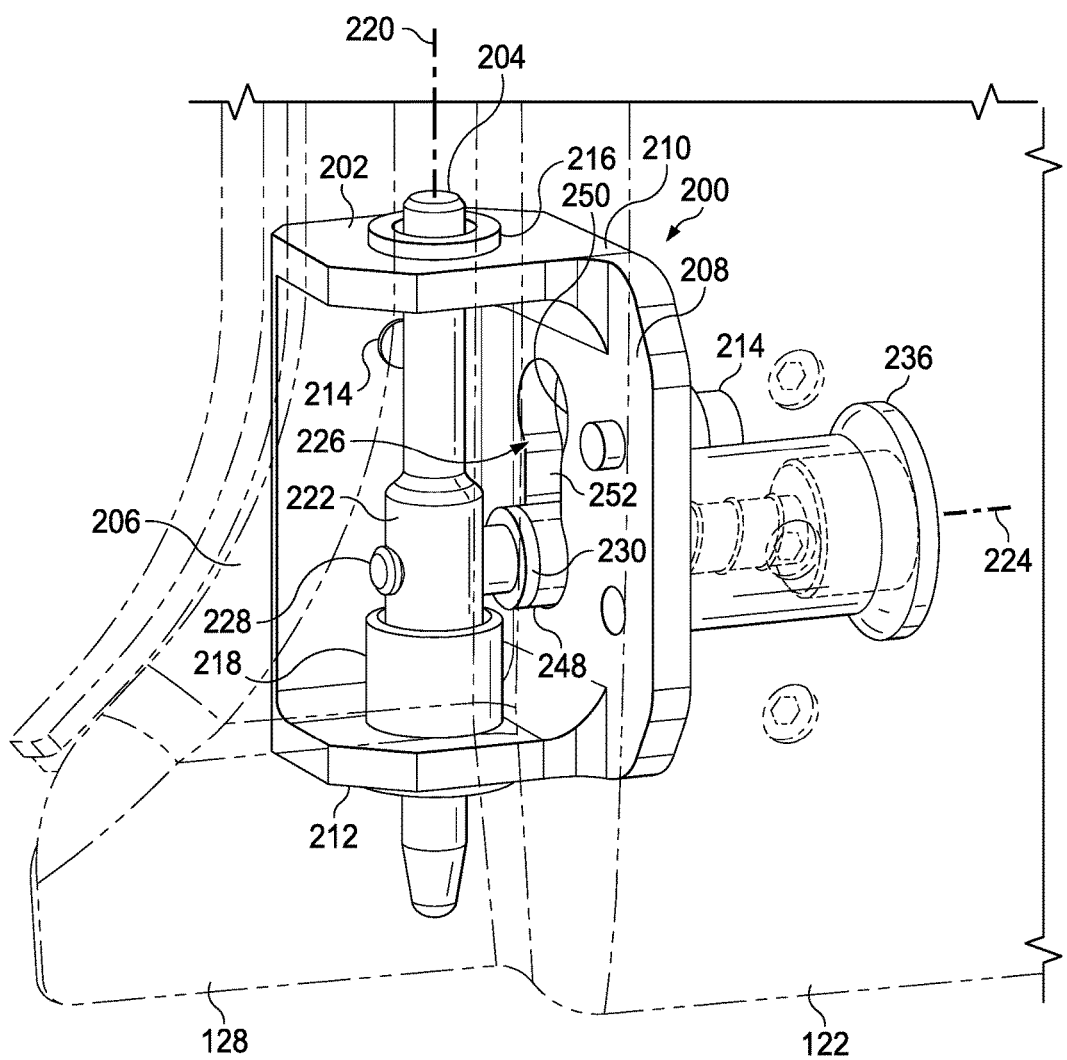
FIG. 10 is a front-left oblique view of the lower located latch system of FIG. 6.

Referring to FIGS. 1-3 in the drawings, a helicopter 100 is illustrated. Helicopter 100 can include a fuselage 102, a landing gear 104, a tail member 106, a main rotor system 108 comprising main rotor blades 110, and a tail rotor system 112 comprising tail rotor blades 114. The main rotor blades 110 and the tail rotor blades 114 can be rotated and selectively controlled in order to selectively control direction, thrust, and lift of helicopter 100. The helicopter 100 further comprises a fore right door 116, an aft right door 118, a fore left door 120, and an aft left door 122. In this embodiment, the fore right door 116 and the fore left door 120 are attached to the fuselage 102 via fore hinges 124 which allow an aft portion of the fore right door 116 and an aft portion of the fore left door 120 to rotate away from the fuselage 102. Also, the aft right door 118 and the aft left door 122 are attached to the fuselage 102 via aft hinges 126 which allow a fore portion of the aft right door 118 and a fore portion of the aft left door 122 to rotate away from the fuselage 102. In this embodiment, each of the aft right door 118 and the aft left door 122 comprise a lip 128 against which an aft portion of the fore right door 116 and an aft portion of the fore left door 120 are configured to overlap.

In other words, the aft right door 118 and the aft left door 122 must be in closed positions against the fuselage 102 before proper closure of the fore right door 116 and the fore left door 120 can be accomplished. Further, when starting from completely closed positions, the fore right door 116 must be at least partially opened before the aft right door 118 can be opened and the fore left door 120 must be at least partially opened before the aft left door 122 can be opened. In this embodiment, the helicopter 100 further comprises four latch systems 200. Each of the aft right door 118 and the aft left door 122 comprise door channels 130 adjacent the lip 128 and latch systems 200 are disposed in an upper portion of each door channel 130 and disposed in a lower portion of each door channel 130. In this embodiment, the aft right door 118 and the aft left door 122 are substantially symmetrical or mirror images of each other. Although in this embodiment the aft right door 118 and the aft left door 122 are not identical, in some embodiments, the latch systems 200 carried by the aft right door 118 and the aft left door 122 are substantially the same, identical, and/or interchangeable.

Referring now to FIGS. 5-10, each latch system 200 comprises a housing 202 and a pin 204 that is carried by the housing 202 and movable relative to the housing 202. The housing 202 comprises a mount wall 206 connected to a control wall 208 that is substantially orthogonal relative to the mount wall 206. The housing 202 further comprises an inner wall 210 that is substantially orthogonal to each of the mount wall 206 and the control wall 208. Still further, the housing 202 comprises an outer wall 212 that is substantially parallel to the inner wall 210 and offset from the inner wall 210. Each of the mount wall 206 and the control wall 208 comprises apertures configured to receive fasteners 214 that are used to connect the housing 202 to the door channel 130. Each of the inner wall 210 and the outer wall 212 comprise coaxial apertures configured to receive an inner bushing 216 and an outer bushing 218, respectively. The inner bushing 216 and the outer bushing 218 comprise apertures configured to receive the pin 204 therethrough and configured to allow movement of the pin 204 along a pin axis 220 of the latch system 200. The pin 204 comprises an enlarged receiver 222 comprising an aperture through the receiver 222 and the aperture extends along a receiver axis 224.

The mount wall 206 comprises a control aperture 226 through which a control rod 228 extends and is received within the aperture of the receiver 222 of the pin 204. In some embodiments, an end portion of the control rod 228 may be threaded to complement threads of the aperture of the receiver 222. The control rod 228 further comprises a shelf 230 sized and configured to not be able to pass through the control aperture 226. The control rod 228 further carries a cap 232 comprising a larger outer diameter than the outer diameter of the control rod 228 that extends through the control aperture 226. The cap 232 can comprise a threaded hole configured to receive a threaded end of the control rod 228.

Still further, the latch system 200 comprises a control knob 236. The control knob 236 is a tubular member comprising several differentiated internal and external diameters so as to provide a cap space 238 through which the cap 232 can translate along the receiver axis 224, an intermediate space 240 that is too small in internal diameter to allow entry of the cap 232, and a rod space 242 that comprises an internal diameter substantially complementary to an outside diameter of the control rod 228. In this embodiment, the spring 234 is wound around the control rod 228 and is compressed between the cap 232 and an interior wall 244 of the control knob 236 so that the control knob 236 is biased toward the pin 204.

The control aperture 226 generally comprises a dog bone shaped channel comprising a lock hole 246 comprising an inner diameter substantially complementary to a lock tip 248 of the control knob 236. The control aperture 226 further comprises an unlock hole 250 comprising an inner diameter substantially complementary to the lock tip 248. The lock hole 246 and the unlock hole 250 are joined by a rod channel 252 that provides a gap distance large enough for the control rod 228 to extend through but too small for the lock tip 248 to fit into. In some embodiments, the control aperture 226 can be countersunk using a recess 254 so that the lock tip 248 can be maintained within the recess 254 even while the lock tip 248 is not received within either of the lock hole 246 or the unlock hole 250.

In operation, when the aft left door 122 is completely closed, the latch system 200 can be checked to ensure that the latch system 200 pin 204 is in a locked position. The pin 204 is in a locked position when the lock tip 248 is received through the lock hole 246 until an end of the lock tip 248 abuts the shelf 230 of the control rod 228. When the pin 204 is in the above-described locked position, the latch system 200 can be operated to move the pin 204 from the locked position to an unlocked position. To move the pin 204 from the locked position to an unlocked position, the control knob 236 can be pulled away from the pin 204 along the receiver axis 224 and against the biasing force of the spring 234 until the lock tip 248 is fully removed from the lock hole 246. Once the lock tip 248 is removed from the lock hole 246, the control knob 236 can be moved closer to the inner wall 210 by sliding the control rod 228 through the rod channel 252 until the lock tip 248 is aligned with the unlock hole 250. During this movement of the control rod 228, the pin 204 will also move in the same direction along the pin axis 220, thereby retracting the pin 204 from the relatively more extended locked position. Once the lock tip 248 is aligned with the unlock hole 250, the control knob 236 can be released to allow the biasing of the spring 234 to move the lock tip 248 into the unlock hole 250. Once the end of the lock tip 248 abuts the shelf 230, the pin 204 is secured in the unlocked position. Of course, the pin 204 can be returned to the locked position by reversing the above-described steps.

As a function of the above-described operation, the latch system 200 can prevent accidental movement of the pin 204 from a locked position as well as from an unlocked position. In some cases, it is important to ensure the pin 204 remains in an unlocked position so that the aft left door 122 is not accidentally urged toward a closed position with the pin 204 protruding since doing so can cause damage to the helicopter 100 and/or the latch system 200. In other cases, it is important to ensure the pin 204 remains in a locked position so that the aft left door 122 does not undesirably open.

While the latch system 200 is primarily described above as being used with a helicopter 100, in alternative embodiments, the latch system 200 can be utilized in conjunction with any other device. Specifically, the latch system 200 can be incorporated into left doors, right doors, fore doors, aft doors, and doors of airplanes and/or any other vehicle. Still further, the latch system 200 can be utilized in other non-vehicle application while still providing the same ability to selectively secure a pin 204 in a desired position. While not shown, it will be appreciated that the helicopter 100 and/or any other system into which the latch system 200 is incorporated, can comprise a strike plate comprising a hole or any other suitable structure for receiving the pin 204 and securing a door relative to the structure. While the latch system 200 is shown as being located in particular locations relative to a door, in alternative embodiments, the latch system 200 can be located at different locations. Still further, while the helicopter 100 is shown comprising four doors, an alternative embodiment of a helicopter comprising the latch system 200 can comprise a fore left door, an aft left door, and a fore right door without including an aft right door. In other alternative embodiments of a helicopter comprising the latch system 200, a helicopter can comprise only one door or two doors, such as, but not limited to comprising only a fore left door and a fore right door or only a fore left door or a fore right door. In other embodiments, the latch system 200 can be used on any one or more of an aft right door, aft left door, fore right door, and fore left door, and/or any other door carried by the helicopter.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A latch system, comprising:
   a pin movable along a pin axis;
   a control rod connected to the pin;
   a control wall comprising a control aperture comprising a lock hole joined to an unlock hole by a rod channel; and
   a control knob biased toward the pin, wherein the control knob comprises a lock tip sized to fit within each of the lock hole and the unlock hole, but not within the rod channel;
   wherein the control aperture is disposed deeper within the control wall than a control wall recess and wherein the control wall recess is configured to receive the lock tip at all locations along the pin axis and between the lock hole and unlock hole at which the lock tip cannot be received by the rod channel.

2. The latch system of claim 1, wherein the control rod extends through the control aperture.

3. The latch system of claim 1, wherein the control rod is sized to be able to extend through each of the lock hole, the unlock hole, and the rod channel.

4. The latch system of claim 1, wherein when the lock tip is received within the lock hole, the pin is restricted from movement along the pin axis.

5. The latch system of claim 1, wherein when the lock tip is received within the unlock hole, the pin is restricted from movement along the pin axis.

6. The latch system of claim 1, wherein the control aperture is substantially dog bone shaped.

7. The latch system of claim 1, wherein the lock tip comprises an outer diameter complementary to an inner diameter of the unlock hole and complementary to an inner diameter of the lock hole.

8. The latch system of claim 1, wherein the pin comprises an aperture configured to receive the control rod.

9. The latch system of claim 1, wherein the control rod comprises a shelf and wherein the control knob can remain biased toward the pin against the shelf only when the control tip is received within one of the lock hole and the unlock hole.

10. The latch system of claim 1, further comprising:
    an inner wall substantially orthogonally connected to the control wall; and
    an outer wall substantially orthogonally connected to the control wall;
    wherein each of the inner wall and the outer wall comprise apertures for movably receiving the pin.

11. The latch system of claim 10, wherein the inner wall carries an inner bushing and wherein the inner bushing is configured to receive the pin.

12. The latch system of claim 10, wherein the outer wall carries an outer bushing and wherein the outer bushing is configured to receive the pin.

13. The latch system of claim 1, further comprising a cap connected to the control rod.

14. The latch system of claim 13, further comprising a spring compressed between the cap and the control knob.

15. The latch system of claim 13, wherein the control knob comprises a cap space configured to slidably receive the cap therein and wherein the control knob comprises an intermediate space adjacent the cap space, the intermediate space being sized so that the cap cannot fit within the intermediate space.

16. The latch system of claim 1, wherein the control aperture is countersunk.

17. An aircraft, comprising:
    a fuselage;
    a door movably connected to the fuselage; and
    a latch system carried by the door, the latch system comprising:
      a pin movable along a pin axis;
      a control rod connected to the pin;
      a control wall comprising a control aperture comprising a lock hole joined to an unlock hole by a rod channel; and
      a control knob biased toward the pin, wherein the control knob comprises a lock tip sized to fit within each of the lock hole and the unlock hole, but not within the rod channel;
      wherein the control aperture is disposed deeper within the control wall than a control wall recess and wherein the control wall recess is configured to receive the lock tip at all locations along the pin axis and between the lock hole and unlock hole at which the lock tip cannot be received by the rod channel.

18. The aircraft of claim 17, wherein the aircraft comprises a helicopter.

19. The aircraft of claim 17, wherein the control rod extends through the control aperture.

20. The aircraft of claim 17, wherein the control rod is sized to be able to extend through each of the lock hole, the unlock hole, and the rod channel.

* * * * *